United States Patent [19]
Bock et al.

[11] Patent Number: 5,483,869
[45] Date of Patent: Jan. 16, 1996

[54] SEALED ARTICULATED PISTON

[75] Inventors: Allyn P. Bock, Lafayette, Ind.; Stephen V. Kelly, Peoria, Ill.; Samuel L. McLaughlin; Brian R. Weller, both of Lafayette, Ind.

[73] Assignee: Caterpillar Inc., Peoria, Ill.

[21] Appl. No.: 451,245

[22] Filed: May 26, 1995

[51] Int. Cl.⁶ ............................................ F01B 31/10
[52] U.S. Cl. ...................... 92/159; 92/158; 92/189; 92/10; 92/219; 123/193.6
[58] Field of Search ........................... 92/128, 189, 190, 92/216, 219, 159, 158; 123/193.6

[56] References Cited

U.S. PATENT DOCUMENTS

| | | |
|---|---|---|
| 1,594,286 | 7/1926 | Webb et al. ............................... 92/190 |
| 3,448,664 | 6/1969 | Hulsing . |
| 3,555,972 | 1/1971 | Hulsing . |
| 3,613,521 | 10/1971 | Itano . |
| 3,930,472 | 1/1976 | Athenstaedt . |
| 3,995,538 | 12/1976 | Beardmore et al. ....................... 92/190 |
| 4,044,731 | 8/1977 | Lindner . |
| 4,056,044 | 11/1977 | Kamman et al. . |
| 4,178,899 | 12/1979 | Julich . |
| 4,180,027 | 12/1979 | Taylor et al. . |
| 4,286,505 | 9/1981 | Amdall . |
| 4,358,881 | 11/1982 | Mahrus et al. . |
| 4,372,194 | 2/1983 | Vallaude ..................................... 92/176 |
| 4,644,853 | 2/1987 | Russell et al. . |
| 4,662,319 | 5/1987 | Ayoul . |
| 4,805,518 | 2/1989 | Heban, Jr. . |
| 5,029,562 | 7/1991 | Kamo . |
| 5,065,508 | 11/1991 | Lorento et al. . |
| 5,070,768 | 12/1991 | Goncalves et al. . |
| 5,086,736 | 2/1992 | Wiemann ................................. 92/158 |
| 5,144,884 | 9/1992 | Kelly . |
| 5,144,923 | 9/1992 | Leites et al. . |
| 5,150,517 | 9/1992 | Martins Leites . |
| 5,230,148 | 7/1993 | Martins Leites . |
| 5,245,752 | 9/1993 | Lippai et al. . |
| 5,282,411 | 2/1994 | Hirai et al. . |
| 5,317,958 | 6/1994 | Martins Leites . |

FOREIGN PATENT DOCUMENTS

| | | | |
|---|---|---|---|
| 1751405 | 5/1976 | Germany . | |
| 3643828 | 6/1988 | Germany . | |
| 3241343 | 7/1993 | Germany . | |
| 510526 | 7/1939 | United Kingdom ..................... 92/190 |
| 617224 | 2/1949 | United Kingdom . | |
| 1558393 | 1/1980 | United Kingdom . | |
| 94/07016 | 3/1994 | WIPO . | |

*Primary Examiner*—Thomas E. Denion
*Attorney, Agent, or Firm*—Diana L. Charlton

[57] ABSTRACT

The design and construction of past articulated pistons include an open space between a head portion and an independent skirt portion. The open space allows excess cooling fluid, such as oil, to exit the piston and flow toward the cylinder, increasing oil consumption and carbon deposits within the engine. The present invention overcomes these problems by positioning a sealing means within an open space between a head portion and a skirt portion of an articulated piston. The sealing means completely blocks the oil from exiting the piston while being adequately conformable to allow the necessary articulation between the head and skirt portions.

16 Claims, 3 Drawing Sheets

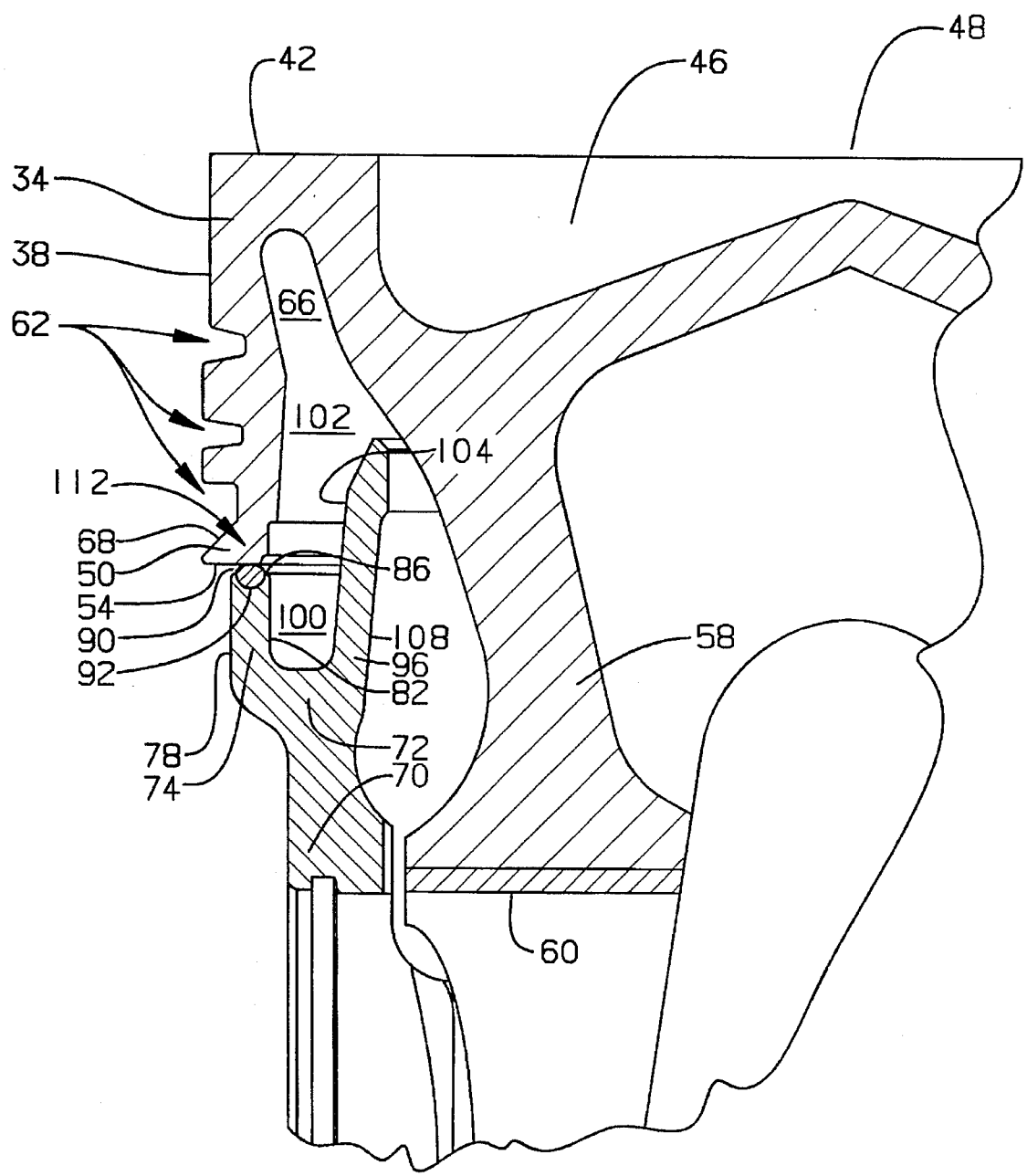
Fig_2_

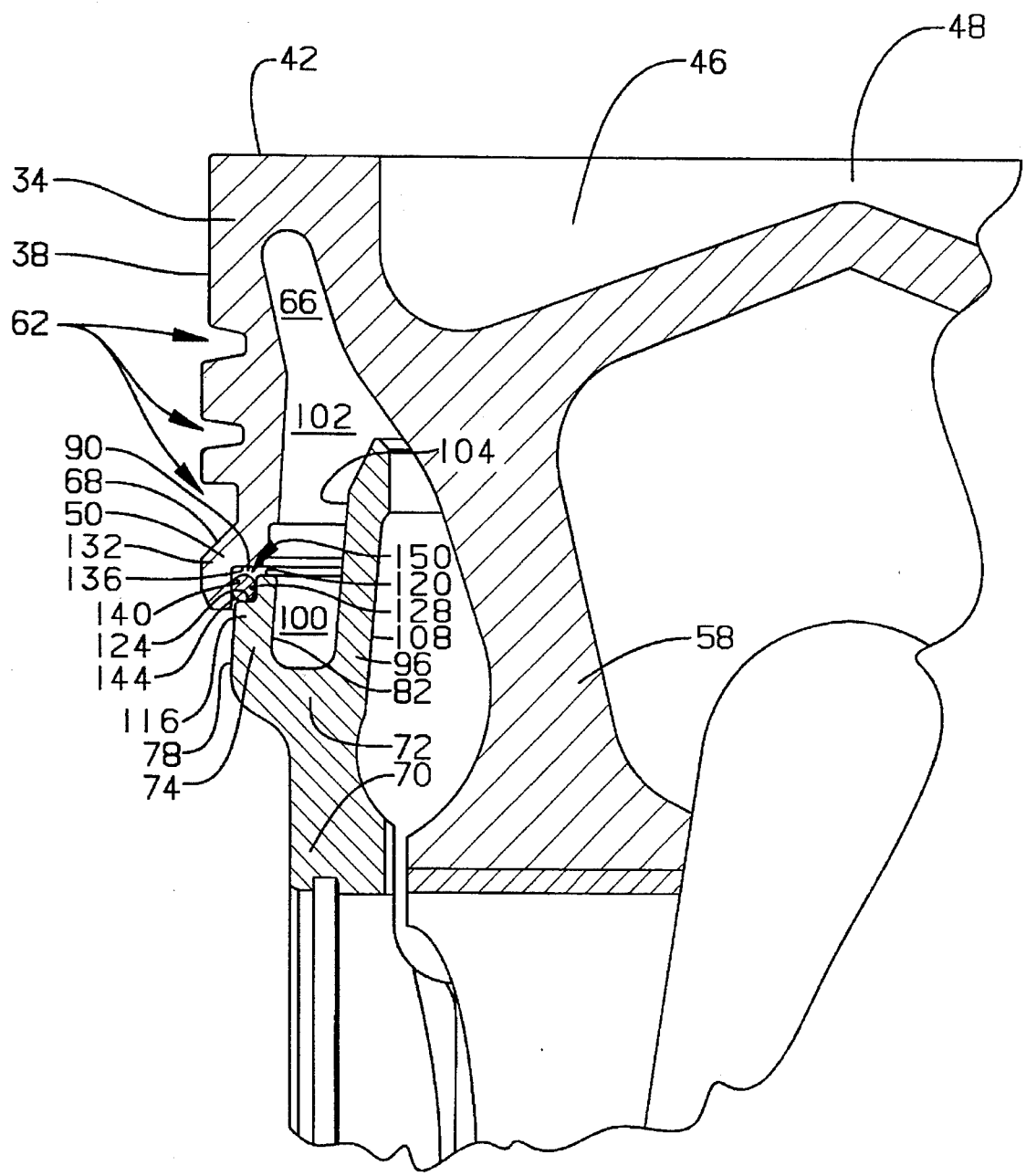
Fig_3

5,483,869

SEALED ARTICULATED PISTON

TECHNICAL FIELD

This invention relates to articulated pistons for internal combustion engines and more particularly to a method of sealing between independent head and skirt portions.

BACKGROUND ART

Present day high performance diesel engines operate at high thermal and mechanical loads. Articulated pistons have been used in present day diesel engines due to their ability to perform in these environments. Due to the inherent structure of articulated pistons, they can withstand high thermal and mechanical loads. The independent head and skirt portions of the articulated piston design are assembled to maintain a clearance therebetween. This lack of contact allows the head portion and the skirt portion to function independently from one another. For instance, the head portion is designed to withstand the high combustion pressures and temperatures incurred during the operation of the engine while the skirt portion acts as a guide for the piston in the cylinder.

Due to the high temperatures in which the articulated pistons operate, it is important that adequate cooling is provided to the ring zone, located in the head portion, to minimize excessive wear on the ring grooves and excessive carbon formation. Generally, the head portion is manufactured with a cavity located between the combustion chamber and the ring zone. The skirt portion has a trough formed therein adjacent the cavity to define an oil gallery. Cooling oil is circulated into the oil gallery by way of an injection nozzle. However, during normal operation of the piston, the amount of cooling oil may become excessive within the oil gallery. Therefore, a portion of the cooling oil tends to overflow the trough and flow toward the cylinder through the clearance space between the head and skirt portions. Unfortunately, this process increases oil consumption and wear while raising emissions levels due to the build-up of carbon deposits on the top land of the piston and in the ring grooves.

One approach in avoiding these concerns is disclosed in U.S. Pat. No. 5,070,768 issued to Victor A. M. D. Goncalves, et al., on Dec. 10, 1991. In this approach, with the piston assembled, the lower end of the head portion below the ring zone and the upper end of the skirt portion define an oil baffle designed to prevent the cooling oil from flowing from the piston toward the space between the piston and the cylinder. For example, in one embodiment, the head and skirt portions each have a notch and projection with the projection of one fitting into the notch of the other to form the baffle. Unfortunately, the baffle only serves to inhibit the flow of cooling oil from the piston toward the cylinder through the opening and does not completely eliminate the problem.

The present invention includes a method of sealing the open space between the piston and the cylinder while still allowing the articulation advantages of a two-piece piston design. The present invention provides an inexpensive and efficient method of sealing for eliminating the loss of cooling oil from the piston to the cylinder.

DISCLOSURE OF THE INVENTION

In one aspect of the present invention an articulated piston comprises a head portion including a combustion bowl area therein. The head portion has a lower outer portion defining a plurality of ring grooves and has an annular cavity between the combustion bowl area and the plurality of ring grooves. An independent skirt portion has an upper outer portion adjacent the lower outer portion of the head portion defining an open space therebetween. The skirt portion has an annular trough therein in fluid communication with the annular cavity to form a cooling gallery. Sealing means is disposed between the skirt portion and the head portion for closing the open space. The sealing means extends from the upper outer portion and terminates in contacting relationship with the lower outer portion of the head portion.

In another aspect of the present invention, an articulated piston in combination with an internal combustion engine with a cooling system containing a cooling fluid comprises a head portion including a combustion bowl area therein. The head portion has a lower outer portion defining a plurality of ring grooves and has an annular cavity between the combustion bowl area and the plurality of ring grooves in communication with the cooling fluid. An independent skirt portion has an upper outer portion adjacent the lower outer portion of the head portion defining an open space therebetween. The skirt portion has an annual trough therein in fluid communication with the annular cavity to form a cooling gallery. Sealing means is disposed between the head portion and the skirt portion for closing the open space and for blocking the cooling fluid from exiting the cooling gallery through the open space. The sealing means extends from the upper outer portion of the skirt and terminates in contacting relationship with the lower outer portion of the head portion.

The disadvantage of the prior art is that they fail to completely eliminate the problem of cooling fluid exiting the articulated piston through the open space between the head and skirt portions. The present invention overcomes this disadvantage by providing a sealing means disposed within the open space between a bead portion and a skirt portion of an articulated piston which entirely blocks the cooling fluid from exiting the piston. The present invention utilizes a simple and economical design thereby minimizing complexity and cost.

BRIEF DESCRIPTION OF THE DRAWINGS

FIG. 2 is an enlarged diagrammatic sectional view of an embodiment of the present invention shown in FIG. 1; and FIG. 3 is an enlarged diagrammatic sectional view of an alternative embodiment of the present invention.

BEST MODE FOR CARRYING OUT THE INVENTION

Figure 1:
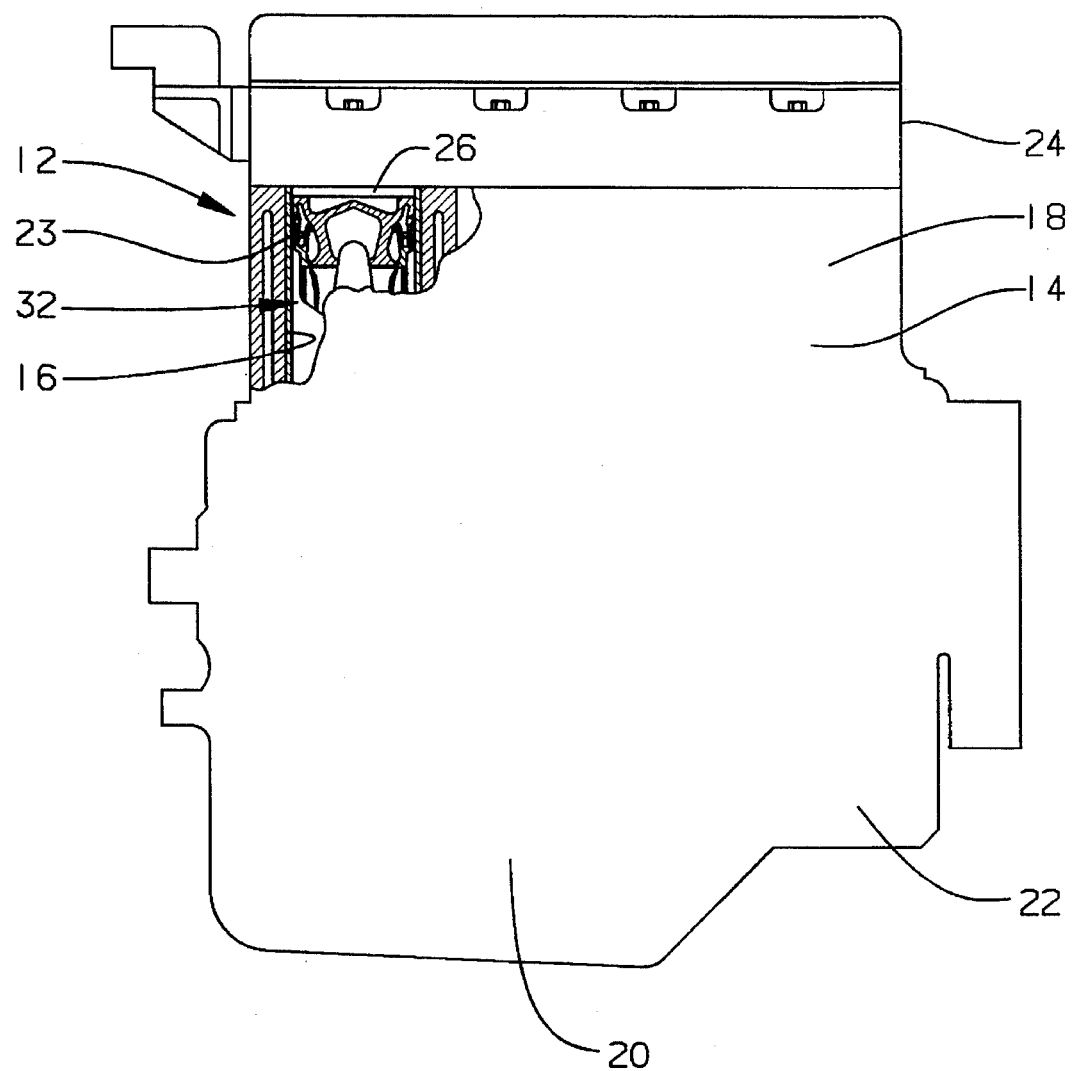
FIG. 1 is a diagrammatic sectional view illustrating an internal combustion engine including an embodiment of the present invention.

An innernal combustion engine 12 with a cylinder block 14 is illustrated in FIGS. 1–3. The cylinder block 14 defines a plurality of cylinders, one of which is shown at 16, at an upper end portion 18 and a crankcase portion 20 at a lower end portion 22. The crankcase portion 20 contains a preset amount of lubricating oil (not shown) which is circulated through the engine 12 in a conventional manner. A cylinder liner 23 is mounted within each of the plurality of cylinders 16. A cylinder head 24 is mounted in closing relation to the cylinder block 14 to define a plurality of combustion chambers, one of which is shown at 26. An articulated piston 32 is reciprocally movable within each of the cylinder liners 23 between a top dead center position (TDC) and a bottom dead center position (BDC) to sequentially define an intakesstroke, a compression stroke, an expansion stroke, and an exhaust stroke. Henceforth, the engine 12 will be described from the perspective of a single cylinder. However, it should be understood that the present invention may be used on either a single or multiple cylinder engine.

Referring more specifically to FIG. 2, the articulated piston 32 has an annular head portion 34 with an outer surface 38. An upper surface 42 blendingly extends from the outer surface 38 and is contoured to define a combustion bowl area 46. The combustion bowl area 46 extends a predetermined distance from a substantially central location 48 in the head portion 34 toward the outer surface 38. A lower outer portion 50 extends downwardly from the upper surface 42 a predetermined distance and has a planar lower surface 54 which blendingly extends from the outer surface 38. A lower inner portion 58 extends downwardly from the upper surface 42 a predetermined distance at approximately the central location 48 and has a lower surface 60. A plurality of ring grooves 62 are defined within the lower outer portion 50 and extend a predetermined distance inwardly from the outer surface 38. An annular cavity 66 is defined between the lower outer portion 50 and the lower inner portion 58 to separate the combustion bowl area 46 from the plurality of ring grooves 62. One of the plurality of ring grooves 62 is formed with an angled blow-by gas relief slot 68.

The articulated piston 32 has an annular skirt portion 70, independent of the head portion 34, yet operatively associated therewith. The skirt portion 70 has an upper portion 72 with an annular outer leg 74 extending from the upper portion 72. The outer leg 74 has a predetermined length and has an inner and an outer surface 78 and 82, respectively. The outer leg 74 has a planar upper surface 86 blendingly extending between the inner and outer surfaces 78,82. The upper surface 86 is located adjacent the lower surface 54 of the lower outer portion 50 of the head portion 34 and is spaced a predetermined distance therefrom to define an open space 90 therebetween. The outer leg 74 has an annular groove 92 with a predetermined depth therein defined by the upper surface 86. An inner leg 96 is blendingly formed and extends from the upper portion 72 and terminates within the annular cavity 66. The inner leg 96 is spaced a predetermined distance from the outer leg 74 to define an annular trough 100 in communication with the annular cavity 66. The annular cavity 66 and the annular trough 100 define a cooling gallery 102 communicating with the orifice 68. The inner leg 96 has a predetermined length greater than the predetermined length of the outer leg 74 and has an inner and an outer surface 104 and 108, respectively. The inner leg 96 extends toward the lower inner portion 58 and terminates in close proximity therewith to define a gap 98 therebetween.

Sealing means 112 of any suitable type, such as a face type o-ring seal, is disposed within the annular groove 92 and is in contacting relation with the lower surface 54 of the head portion 34 for blocking the open space 90 between the head and skirt portions 34,70. The o-ring seal is made from a resilient elastomeric material and has a predetermined diameter which allows for good sealing characteristics. However, it should be understood that the sealing means 112 may be a resilient layer of material attached to the lower surface 54 of the head portion 34 and the upper surface 86 of the skirt portion 70.

Another embodiment of the present invention is shown in FIG. 3. It should be noted that the same reference numerals of the first embodiment are used to designate similarly constructed counterpart elements of this embodiment. It should be understood that the principles and techniques for the first embodiment described can be applied to this embodiment shown and to any variations thereof.

Referring more specifically to FIG. 3, the outer leg 74 of the skirt portion 70 has a stepped upper end portion 116 with an upper planar surface 120 and a lower planar surface 124. An intermediate surface 128 extends between the lower planar surface 124 and the upper planar surface 120 and is generally perpendicular to both surfaces 120,124.

The lower outer portion 50 of the head portion 34 has a stepped end portion 132 with a lower planar surface 136 substantially parallel with the upper planar surface 120 of the outer leg 74 and is spaced a predetermined distance therefrom to define the open space 90. A planar inner surface 140 extends downwardly from the lower planar surface 136 and terminates adjacent the outer surface 78 of the outer leg 74. The inner surface 140 is substantially parallel with the intermediate surface 128 and is spaced a predetermined distance therefrom to define a partially enclosed groove 144 in conjunction with the lower planar surface 124.

Sealing means 150 of any suitable type, such as a radial type o-ring seal, is disposed within the groove 144 between the intermediate surface 128 and inner surface 140 for blocking the open space 90 between the head and skirt portions 34,70. The radial seal is made from a resilient elastomeric material and has a predetermined diameter which allows for good sealing characteristics. However, it should be understood that the sealing means 150 may be a resilient layer of material attached to the inner surface 140 of the head portion 34 and the intermediate surface 128 of the skirt portion 70.

INDUSTRIAL APPLICABILITY

In use, cooling fluid, such as lubricating oil, is circulated from the engine crankcase 20 to the articulated piston 32 through a series of passages (not shown) via a conventional lubrication pump and nozzle system (not shown). Most of the cooling fluid exits the piston 32 through an outlet orifice (not shown). However, during the reciprocation of the piston 32 within the cylinder liner 23, inertia forces are developed which cause a portion of the cooling fluid to remain within the piston 32. The cooling fluid which remains in the piston 32 generally accumulates within the annular trough 100 and the annular cavity 66. Eventually, the accumulated cooling fluid exceeds the capacity of the annular trough 100 causing a portion of the excess cooling fluid to overflow toward the cylinder liner 23 through the open space 90.

The articulated piston 32 shown in FIG. 2, is assembled by stretch fitting the face type o-ring seal 112 within the annular groove 92 on the skirt portion 70. The skirt portion 70 is assembled to the head portion 34 so that the face seal 112 contacts the lower planar surface 54 in a manner which provides adequate sealing through all cycles of the internal combustion engine 12. This is accomplished by slightly press fitting the skirt portion 70 to the head portion during assembly of the piston pin (not shown). The slight press fit displaces the face seal 112 material a predetermined amount between the head and skirt portions 34,70 providing the sealing feature. Minimal seal compression must be maintained during operation of the engine 12 and subsequent temperature elevations to obtain adequate displacement of material. Therefore, it is important that the initial seal compression applied at room temperature is calculated to compensate for temperature fluctuations encountered during engine operation. Furthermore, during engine operation, the face seal 112 must be free to conform during the articulation of the piston 32 so that movement between the head portion 34 and the skirt portion 70 is substantially uncompromised. Relative conformity of the face seal 112 is accomplished due to the elastomeric nature of the seal material.

The articulated piston 32 shown in FIG. 3, is assembled by positioning the radial type o-ring seal 150 within the partially enclosed groove 144 in the skirt portion 70. The skirt portion 70 is assembled to the head portion 34. The head and skirt portions 34, 70 each have predetermined dimensional characteristics which produce an interference fit between the intermediate surface 128 and the inner surface 140 pressing the radial seal 150 therebetween. During engine operation, the radial seal 150 is maintained in the interference fit and conforms adequately so that articulation between the head portion 34 and the skirt portion is substantially uncompromised. It should be understood that the articulation between the head and skirt portions 34, 70 is substantially in the axial direction. The axial movement between the head and skirt portions 34, 70 creates no additional load on the radial seal 150 since it is compressed by radially induced loads. Without the additional axial loads and related stresses, the life of the radial seal 150 can be increased.

It should be understood that a resilient sealing material, such as a form-in-place liquid silicon sealant, may be utilized which would be deposited between the head portion and the skirt portion of the articulated piston. The resilient sealing material would have to provide adequate conformability so that articulation between the head and skirt portion is uncompromised.

The introduction of blow-by gas into the cooling gallery 102 of the piston 32 through the ring grooves 62 may increase the temperature and particulates therein, deteriorating the sealing means 112, 150 and reducing the operating life. In order to protect the sealing means 112,150 from the blow-by gas entering the cooling gallery 102, a blow-by relief slot 68 has been included to allow blow-by gas to escape therethrough before entering the piston 32. Therefore, blow-by gas harmful to the sealing means 112,150 is prevented from entering the cooling gallery 102.

In view of the above, it is apparent that the present invention provides an improved means for preventing cooling fluid from exiting the piston and flowing toward the cylinder liner. The present invention utilizes a sealing means between the head portion and skirt portion of an articulated piston within an internal combustion engine which does not compromise the articulation therebetween. The present invention is simple, cost-effective, and eliminates excess oil consumption while decreasing emission levels.

We claim:

1. An articulated piston, comprising:
   a head portion including a combustion bowl area therein and having a lower outer portion defining a plurality of ring grooves, the head portion having an annular cavity between the combustion bowl area and the plurality of ring grooves;
   an independent skirt portion having an upper outer portion adjacent the lower outer portion of the head portion defining an open space therebetween, the skirt portion having an annular trough therein in fluid communication with the annular cavity to form a cooling gallery;
   sealing means disposed between the skirt portion and the head portion for closing the open space, the sealing means extending from the upper outer portion and terminating in contacting relationship with the lower outer portion of the head portion.

2. The articulated piston of claim 1, wherein the sealing means is attached at a lower end to the upper outer portion of the skirt portion and at an upper end to the lower outer portion of the head portion.

3. The articulated piston of claim 1, including that the upper outer portion has an upper planar surface defining an annular groove therein.

4. The articulated piston of claim 1, including that the upper outer portion of the skirt portion and the lower outer portion of the head portion each have a stepped end portion in mating relation to each other to define a partially enclosed groove.

5. The articulated piston of claim 3, wherein the sealing means is disposed within the annular groove.

6. The articulated piston of claim 4, wherein the sealing means is disposed within the partially enclosed groove.

7. The articulated piston of claim 5, wherein the sealing means is a face type o-ring seal.

8. The articulated piston of claim 6, wherein the sealing means is a radial type o-ring seal.

9. An articulated piston in combination with an internal combustion engine having a cooling system containing a cooling fluid, comprising:
   a head portion including a combustion bowl area therein and having a lower outer portion defining a plurality of ring grooves, the head portion having an annular cavity between the combustion bowl area and the plurality of ring grooves in communication with the cooling fluid;
   an independent skirt portion having an upper outer portion adjacent the lower outer portion of the head portion defining an open space therebetween, the skirt portion having an annual trough therein in fluid communication with the annular cavity to form a cooling gallery;
   sealing means disposed between the head portion and the skirt portion for closing the open space and for blocking the cooling fluid from exiting the cooling gallery through the open space, the sealing means extending from the upper outer portion of the skirt and terminating in contacting relationship with the lower outer portion of the head portion.

10. The articulated piston of claim 9, wherein the sealing means is attached at a lower end to the upper outer portion of the skirt portion and at an upper end to the lower outer portion of the head portion.

11. The articulated piston of claim 9, including that the upper outer portion has an upper planar surface defining an annular groove therein.

12. The articulated piston of claim 9, including that the upper outer portion of the skirt portion and the lower outer portion of the head portion each have a stepped end portion in mating relation to each other to define a partially enclosed groove.

13. The articulated piston of claim 11, wherein the sealing means is disposed within the annular groove.

14. The articulated piston of claim 12, wherein the sealing means is disposed within the partially enclosed groove.

15. The articulated piston of claim 13, wherein the sealing means is a face type o-ring seal.

16. The articulated piston of claim 14, wherein the sealing means is a radial type o-ring seal.

* * * * *